Sept. 7, 1926.

Re. 16,415

J. W. WARREN

CONCRETE TILE

Original Filed June 11, 1923

Inventor

John Wright Warren,

By Wm. C. Dyer,

Attorney

Reissued Sept. 7, 1926. Re. 16,415

UNITED STATES PATENT OFFICE.

JOHN WRIGHT WARREN, OF ELIZABETHTON, TENNESSEE.

CONCRETE TILE.

Original No. 1,559,159, dated October 20, 1925, Serial No. 648,602, filed June 11, 1923. Application for reissue filed May 8, 1926. Serial No. 107,821.

This invention relates to improvements in tile and more particularly to an improved concrete tile of the Spanish type.

The primary object of the invention is to furnish a relatively light concrete tile of inexpensive construction, which may be placed in proper order on a roof by an unskilled person and which when assembled on a roof will form a leak-proof construction.

Another object of the invention is to provide tiles which will overlap accurately without tapering the tiles. This is accomplished by making the lower edge at one side of the tile in substantially the same plane as the upper surface of an opposite portion of the tile.

That is to say it is an object of the present invention to product cement or concrete roofing tiles of the character indicated, provided with end and intermediate transversely arranged downwardly extending ribs or flanges, which latter together with the body of the tile are of equal depth or thickness at all points when measured in perpendicular planes from the base line of said ribs; or in other words, tiles of pantile form having curved surfaces, either convex, concave, or a combination of the two, in which the extreme top and the extreme bottom radii of their body portions, are the same, and from which depend the ribs or flanges aforesaid, thereby insuring a close-fitting end fit and weather-proof joints between adjacent overlapping tiles, not otherwise obtainable.

A further object of this invention is the production of cement or concrete tiles of the Spanish type having a substantially semi-cylindrical body portion, as distinguished from the ordinary pressed clay Spanish tile having tapering or downwardly diverging sides.

A further object is to provide a tile of this character with an upwardly extending inclined lug at one edge which will serve to cut off capillary attraction and prevent leakage in the finished roof.

A further object is to provide a tile with spaced depressions to facilitate driving a nail through the tile at the proper point. These depressions are so arranged that the tile may be cut in various ways for hips and valleys in a roof and still depressions for the nails will be left at the portion of the tile retained.

Another object of the invention is to provide a tile of this character with transverse end lugs adapted to engage cleats on a roof. Extra lugs are provided between the ends of the tile so that the tile can be used in one-third or two-thirds lengths and still be capable of engaging a roof cleat. The lugs on the tile also serve to reinforce the latter and produce a tile of maximum strength and minimum weight.

With the foregoing objects outlined and with other objects in view which will appear as the description proceeds, the invention consists in a novel article of manufacture illustrated in the accompanying drawings and more particularly defined in the claims.

Referring to the drawings.

Figure 4:
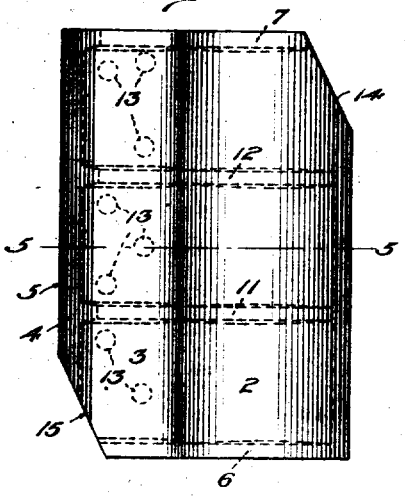
Fig. 4 is a top plan view of one of the improved tiles.
Figure 3:
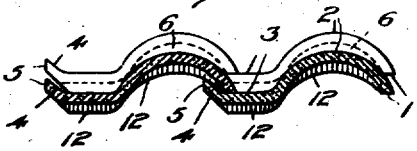
Fig. 3 is a transverse vertical sectional view taken on the line 3—3 of Fig. 2.
Figure 5:
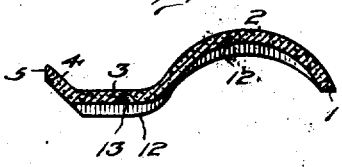
Fig. 5 is a transverse vertical sectional view taken on line 5—5 of Fig. 4.

As best shown in Figs. 4 and 5, the improved tile has a horizontal edge portion 1 which forms the extremity of a semi-cylindrical portion 2 and is arranged in substantially the same plane as the upper surfaces of an intermediate portion 3 of the tile. An upwardly and outwardly extending inclined portion 4 extends from the portion 3 to the vertical side edge 5. The edge 1 is arranged in substantially the same plane as the upper surface of the part 3 in order that said edge may rest on the part 3 of an adjacent tile when the tiles are in assembled relation, as shown in Fig. 3, and this without causing the tile to incline transversely. The upwardly and outwardly inclined portion 4, as shown in Fig. 3, is adapted to extend under the semi-cylindrical portion 2 of an adjacent tile and the ribs 11 and 12 on the under side of portion 2 will cut off capillary attraction and prevent rain and the like from working under the edge 1 of one tile and passing up the portion 4 which lies beneath the same.

Figure 1:
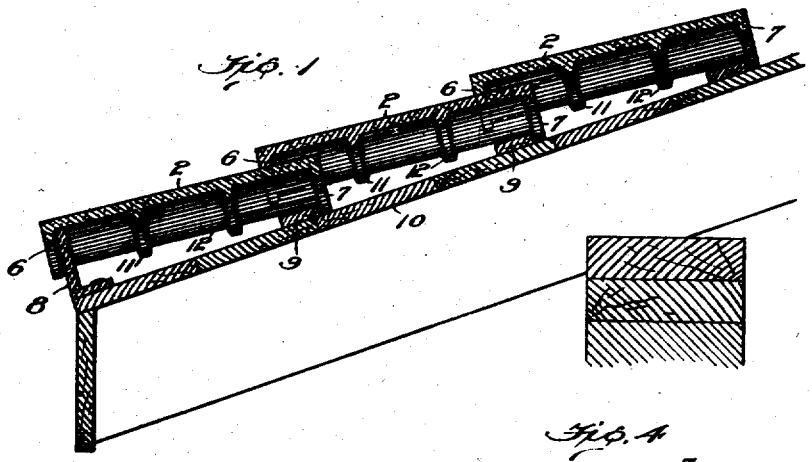
Figure 1 is a vertical sectional view of a slanting roof with a few of the improved tiles arranged thereon.

The tile is provided with two downwardly extending transverse end ribs 6 and 7, which as shown in Fig. 1, are designed to engage cleats 8 and 9 arranged on the roof 10 in order to prevent longitudinal movement of the tiles.

In addition to the end ribs 6 and 7, the tile is also provided with depending transverse ribs 11 and 12 which function to reinforce the tile, and act as cleat engaging members when the tile is divided transversely. For instance if a point in the roof is reached where a tile of full length cannot be used, then the tile is divided so that the part used is either one-third or two-thirds the entire length of the original tile. Under such circumstances either the rib 11 or 12 may engage the cleat 9 on the roof. Rib 6 also serves to cut off capillary attraction and prevent leakage. And, it will be particularly noted that the ribs 6, 7, 11 and 12 aforesaid, together with the body of the tile, are of equal depth or thickness at all points when measured in perpendicular planes from the base line of said ribs.

The intermediate portion 3 of the tile is provided on its under side with depressions 13 which do not extend entirely through the tile. These depressions are provided to enable a nail to be driven through the tile at a desired point without splitting the tile. A number of these depressions 13 are placed in each tile, so that a nail may be driven through one of the depressions even though the tile has been cut transversely or diagonally into a piece one-third or two-thirds or any size of its original length. For instance, if the end portion of the tile beyond the rib 12 is cut off, then one of the depressions 13 lying between the ribs 11 and 12 may be utilized in driving the nail.

Figure 2:
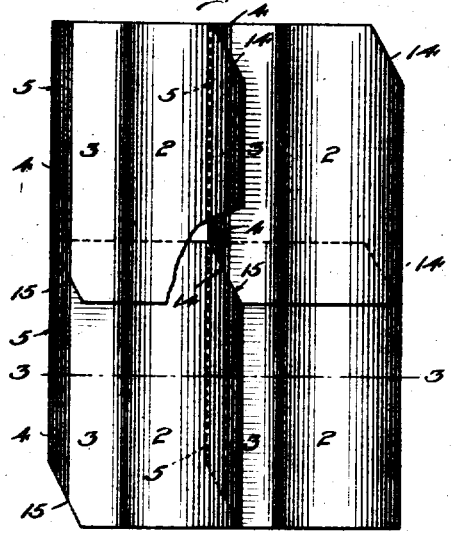
Fig. 2 is a top plan view partly broken away of four of the improved tiles arranged in assembled relation.

Diagonally opposite corners of the tile are provided with parallel edges 14 and 15 to facilitate laying the tiles. As shown in Fig. 2, the edge 15 of one tile abuts against the edge 14 of an adjacent tile in a lower row and this engagement aids in preventing shifting movement of either tile.

From the foregoing it is believed that the construction of the tiles and the manner of laying the same will be readily understood, and it is apparent that changes in design may be resorted to within the scope of the appended claims.

What I claim and desire to secure by Letters Patent is:

1. A roofing tile of pantile form including transverse downwardly-extending cleat-engaging ribs, which latter together with the body of the tile are of equal thickness at all points when measured in perpendicular planes from the base line of the ribs aforesaid.

2. A roofing tile of pantile form including transverse downwardly-extending cleat-engaging end ribs, which latter together with the body of the tile are of equal thickness at all points when measured in perpendicular planes from the base line of the ribs aforesaid.

3. A roofing tile of pantile form having parallel sides and transverse downwardly-extending cleat-engaging ribs, which latter together with the body of the tile are of equal thickness at all points when measured in perpendicular planes from the base line of the ribs aforesaid.

4. A tile including transverse downwardly-extending cleat-engaging end ribs, spaced downwardly extending transverse intermediate ribs and nail receiving cavities formed in said tile throughout its length, all constructed and arranged to provide cleat-engaging ribs and means for fastening the tile to the roof when said tile is transversely divided.

5. A tile including a substantially semi-cylindrical portion terminating in a horizontal edge, an intermediate portion merging into the substantially semi-cylindrical portion and having an unobstructed upper surface in substantially the same plane as said horizontal edge, an upwardly and outwardly inclined portion merging into said intermediate portion and forming an edge portion of the tile adapted to rest beneath the substantially semi-cylindrical portion of a similar tile, transverse end ribs projecting downwardly from the under surface of the tile, and continuous transverse downwardly extending intermediate ribs arranged on the under side of the tile and spaced from the end ribs to provide cleat-engaging members when the tile is split transversely, the intermediate portion of the tile having depressions arranged between the intermediate ribs and the end ribs, said depressions being of less depth than the thickness of the intermediate portion of the tile and extending only part way through said intermediate portion.

6. A cement or concrete tile including transverse downwardly-extending cleat-engaging end ribs, which latter together with the body of the tile are of equal thickness at all points when measured in perpendicular planes from the base line of the ribs aforesaid, in combination with spaced downwardly-extending transverse intermediate ribs, said intermediate ribs constructed and arranged to form cleat-engaging ribs when the tile is divided transversely.

7. A cement or concrete tile of the Spanish type having a substantially semi-cylindrical body portion, and transverse downwardly-extending cleat-engaging end ribs, which latter together with the body of the tile are of equal thickness at all points when measured in perpendicular planes from the base line of the ribs aforesaid, in combination with spaced downwardly extending transverse intermediate ribs, the latter constructed and arranged to form cleat-engaging ribs when the tile is divided transversely.

In testimony whereof I affix my signature.

JOHN WRIGHT WARREN.